United States Patent [19]

Adachi

[11] 4,270,146
[45] May 26, 1981

[54] IDENTIFICATION INFORMATION ADDITION SYSTEM OF FACSIMILE APPARATUS

[75] Inventor: Eiichi Adachi, Atsugi, Japan

[73] Assignee: Ricoh Company, Ltd., Tokyo, Japan

[21] Appl. No.: 40,142

[22] Filed: May 18, 1979

[30] Foreign Application Priority Data

May 25, 1978 [JP] Japan .................................. 53-61691

[51] Int. Cl.³ .............................................. H06N 1/40
[52] U.S. Cl. ...................................... 358/256; 358/280
[58] Field of Search ......................... 358/256, 257, 280

[56] References Cited

U.S. PATENT DOCUMENTS

| | | | |
|---|---|---|---|
| 3,678,180 | 7/1972 | Bond | 358/257 |
| 4,064,389 | 12/1977 | Patterson | 358/256 |
| 4,136,261 | 1/1979 | Wada | 358/256 |
| 4,187,520 | 2/1980 | Beduchaud | 358/257 |

FOREIGN PATENT DOCUMENTS 53-32610 3/1978 Japan .

Primary Examiner—Howard W. Britton
Attorney, Agent, or Firm—Oblon, Fisher, Spivak, McClelland & Maier

[57] ABSTRACT

The identification information addition system is provided with an identification information bearing sheet and a random access memory for storing the identification information in the random access memory with the identification information bearing sheet scanned by a scanner. The identification information stored in the random access memory is picked up when an original document or a recording sheet is scanned by a scanner or a plotter so that the identification information is added to an image information of the original document or of the recording sheet, with part of the original image information replaced with the identification information.

6 Claims, 3 Drawing Figures

IDENTIFICATION INFORMATION ADDITION SYSTEM OF FACSIMILE APPARATUS

BACKGROUND OF THE INVENTION

The present invention relates to an identification information addition system for adding an identification information which is not written on an original document to an original image information of the original document on a transmission side or on a reception side of a facsimile apparatus and recording the identification information on a recording sheet on the reception side.

In the facsimile apparatus, when an image information of an original document transmitted from the transmission side is recorded on the recording sheet on the reception side and the recording sheet is taken out, it is requested to add to the original image information an original identification information described in letters, reference symbols or marks, which are not in the original document, indicating from where the original information is transmitted, what kind of information it is and when it is transmitted.

In order to attain this, conventionally, a character generator is employed for producing such an identification information and adding to the original information the identification information, which is not described in the original document, on the transmission side or on the reception side.

However, the character generator is complicated in the mechanism and there is some limitation to the identification information patterns that can be produced by the character generator, and it is not always possible to add any desired identification information to the original image information.

Furthermore, in order that a necessary identification information to be added is produced by the character generator, a read-only memory (ROM) is also required for assigning each character of the identification information successively in a predetermined order, together with other devices, which make the apparatus complicated in the mechanism and expensive.

SUMMARY OF THE INVENTION

It is therefore an object of the present invention to provide an identification information addition system with a simple mechanism for adding a desired identification information to an original image information, with the above-mentioned shortcomings of the conventional system eliminated.

In order to attain this object, in the present invention, the identification information, which is obtained by scanning an identification information bearing sheet, is stored in a memory portion of a memory device located in a predetermined scanning position of a scanner or a plotter for recording information on a recording sheet, and the identification information stored in the memory device is then taken out at the predetermined scanning position of the scanner or of the plotter when an original document or the recording sheet is scanned by the scanner or the plotter, and part of the original image information is replaced with the identification information, whereby the identification information is added to the original image information.

According to the present invention, as the identification information, desired letters, symbols, marks or figures are written in the identification information bearing sheet and are stored in a random access memory, whereby image information can be recorded with addition of the identification information thereto in a desired portion of the recording sheet with a desired space on the transmission side or the reception side, without any limitation to the identification information as in the conventional apparatus.

BRIEF DESCRIPTION OF THE DRAWINGS

For a better understanding of the invention as well as the objects and other features thereof, reference will be had to the following detailed description which is to be read in conjunction with the drawings wherein.

DETAILED DESCRIPTION OF THE PREFERRED EMBODIMENT

Figure 1:
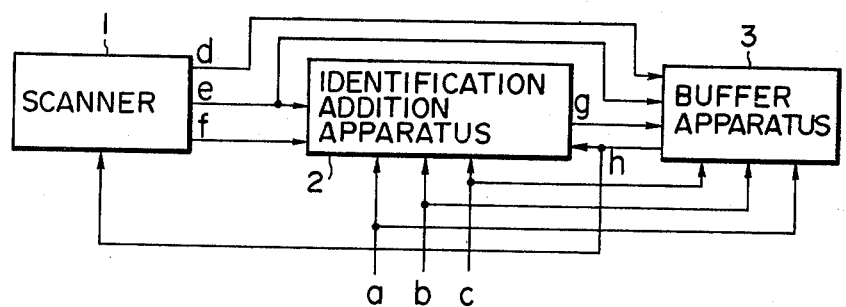
FIG. 1 is a schematic block diagram of an identification information addition system according to the present invention, which is applied to the case where an identification information is added to an image information obtained from a scanner on the transmission side.
Figure 2:
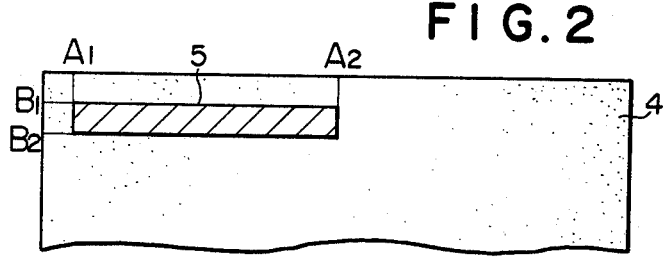
FIG. 2 is a schematic partial plan view of an identification information bearing sheet for use in the present invention.
Figure 3:
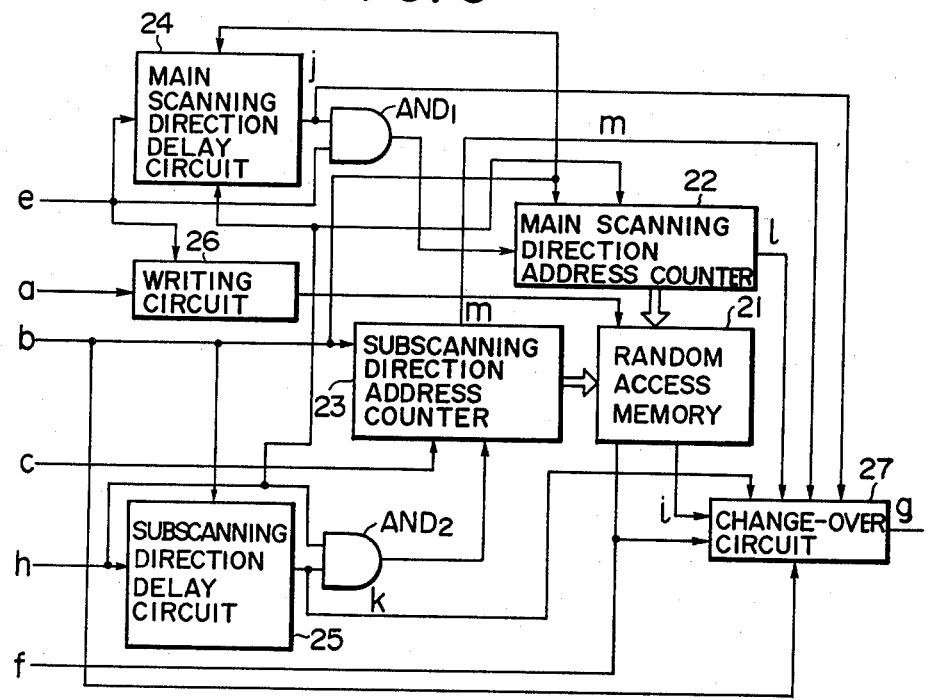
FIG. 3 is a specific block diagram of an identification information addition apparatus of the identification information addition system of FIG. 1.

Referring to FIG. 1 through FIG. 3, an identification information addition system according to the present invention will now be explained, in which an identification information is added to an original image information obtained by a scanner when an original document is scanned on the transmission side.

FIG. 1 is a schematic block diagram of the identification information addition system on the transmission side according to the present invention. In the figure, reference numeral 1 represents a scanner, and reference numeral 2 is an identification information addition apparatus whose specific construction is shown in FIG. 3. Reference numeral 3 represents a buffer apparatus. In operation, a sheet 4 which bears an identification information at a pre-determined position thereof is set in a read apparatus in order to add the identification information at a predetermined position on a recording sheet. The size of the identification information bearing sheet 4 is exactly the same as that of an original document to be transmitted as shown in FIG. 2.

A writing mode is then chosen in order to store the identification information in a random access memory (RAM) 21 (refer to FIG. 3) disposed in the identification information addition apparatus 2 by operating manually a change-over switch disposed in an operation panel (not shown) of this system. When the writing mode is chosen, a writing mode signal a is produced which sets the identification information addition apparatus 2 in the operating condition, and stops a processing operation ahead of the buffer apparatus 3. At the same time, a clear signal b is produced, so that a counter and a shift register are respectively set in their initial states. A line density selection signal c is applied to this system at this moment, which assigns the finest line density that can be set by the facsimile apparatus.

When the read scanning is initiated, a line synchronizing signal d, a main scanning clock e and an image information f which is obtained by scanning the sheet 4 are generated from the scanner 1.

Before the scanning position of the scanner 1 reaches a predetermined identification information writing position 5 of the identification information bearing sheet 4, operation of writing information in the memory of the identification information addition apparatus 2 is not conducted and the image information f produced from the scanner 1 is completely discarded. When the scanner 1 reaches the predetermined identification information writing position 5, as the scanning of the scanner 1 is performed, the identification information is stored successively, one image element after another, in a predetermined address of the random access memory (RAM) 21 which is disposed in the identification information addition apparatus 2 correspondingly to the read position in the main scanning and subscanning directions of the scanner 1. When all of the identification information in the predetermined identification information writing position 5 of the sheet 4 has been completely stored in the predetermined memory position of the random access memory (RAM) 21, the writing mode is terminated.

A transmission mode, which is to be selected after the writing mode, will now be explained, in which the identification information that has been stored in the memory of the identification information addition apparatus 2 is applied to the buffer apparatus 3, line by line, and added to the original image information which is obtained when the original document is scanned by the scanner 1, and the added information is then transmitted from the buffer apparatus 3 to the reception side through a modulator.

With an original document set in the read apparatus, the scanning of the scanner 1 is initiated. At this time, a scanning line density is selected appropriately. Before the scanning position of the scanner 1 reaches the predetermined position where the identification information has been read previously, the image information f obtained from the scanner 1 is caused to pass through the identification information addition apparatus 2 as it is and is applied to the buffer apparatus 3 in the form of an image information g. In the buffer apparatus 3, one line of the image information g, which is applied, following the line synchronizing signal d, is accumulated in a buffer element of the buffer apparatus 3. When one line of the image information g has been accumulated, a step signal h from the buffer apparatus 3 is applied to the scanner 1 and to the identification information addition apparatus 2, so that the next one line of the image information g is accumulated in the next buffer element of the buffer apparatus 3. At the same time, the image information that has already been accumulated in each buffer element of the buffer apparatus 3 is successively taken out by a modulator and is then transmitted to the reception side.

When the scanning position of the scanner 1 reaches the predetermined position where the identification information has been read previously, the identification information which has been stored in the memory of the identification information addition apparatus 2 is applied to the buffer apparatus 3 in place of the image information f.

As a result, when the original document is scanned by the scanner 1, the image information obtained by the scanner 1 is completely replaced with the identification information stored in the memory of the identification information addition apparatus 2 at a scanning position corresponding to the predetermined scanning position where the identification information has been read previously, so that the identification information is applied to the buffer apparatus 3.

Referring now to a more detailed block diagram of the identification information addition apparatus 2 of FIG. 3, the above-mentioned operation will be explained more specifically.

In FIG. 3, reference numeral 21 represents the random access memory (RAM) which stores the image information f, one image element after another, obtained by the scanner 1, in an address assigned by the indication of a main scanning direction address counter 22 and a subscanning direction address counter 23 in the writing mode. On the other hand, in the transmission mode, the random access memory 21 successively applies the information that has been stored previously to a change-over circuit 27 in accordance with the address indication from the address counters 22 and 23.

It is preferable that the random access memory (RAM) 21 be constructed of a non-volatile memory in which once stored information is not erased after turning off the power source of the random access memory 21.

Increment of the main scanning direction address counter 22 and that of the subscanning address counter 23 are respectively conducted by the scanning clock e and the step counter h. The change-over circuit 27 is changed over in accordance with carry signals l and m which are produced when the main scanning direction address counter 22 and the subscanning address counter 23 reach their respective maximum count values.

Reference numeral 24 represents a main scanning direction delay circuit comprising a counter, which determines the writing initiation position or the reading initiation position in the main scanning direction in the random access memory 21 by counting the scanning clock e.

Reference numeral 25 represents a subscanning direction delay circuit, which comprises a counter as in the case of the main scanning direction delay circuit 24 and which determines the writing initiation position or the reading initiation position in the subscanning direction in the random access memory 21 by counting the step signal h.

Reference numeral 26 is a writing circuit for setting the random access memory (RAM) 21 in the writing ready state by the writing mode signal a which is produced when the writing mode is selected.

Reference numeral 27 is the change-over circuit for appropriately changing over the image information f obtained from the scanner 1 in accordance with the scanning position of the scanner 1 to an identification information i produced from the random access memory 21, and vice versa and applying one information of the image information f and the identification information i.

$AND_1$ and $AND_2$ represent respectively AND gates.

In operation, the identification information bearing sheet 4 is set in the read apparatus.

When the writing mode signal a is produced by selecting the writing mode, the identification information addition apparatus is set ready for writing an image information in the random access memory 21 by the writing circuit 26. And by the clear signal b which is produced at the same time, the main scanning direction and the subscanning direction address counters 22 and 23, and the main scanning direction and the subscanning direction delay circuits 24 and 25 are reset and the change-over circuit 27 is switched so as to apply the image information f generated from the scanner 1.

Followed by this step, scanning of the identification information bearing sheet 4 shown in FIG. 2 is initiated. When the main scanning direction reading position of the scanner 1 reaches an identification information reading initiation position $A_1$, with the main scanning direction delay circuit 24 counting the scanning clock e, a carry j is produced and the AND gate $AND_1$ is opened. When the AND gate $AND_1$ is opened, the scanning clock e is applied to the main scanning direction address counter 22.

However, since the subscanning direction reading position of the scanner 1 has not yet reached an identification information reading initiation position $B_1$, a carry k is not generated from the subscanning direction delay circuit 25 and an AND gate $AND_2$ is not opened, and accordingly, the subscanning direction address counter 23 is continuously reset. Therefore, in the random access memory (RAM) 21, there is not any address to be assigned by the mainscanning direction and subscanning direction address counters 22 and 23, so that the image information f is not stored in the random access memory (RAM) 21. When the step signal h is produced from the buffer apparatus 3, with completion of the read scanning of one line in the main scanning direction, the main scanning direction address counter 22 and the main scanning direction delay circuit 24 are reset and one increment is effected in the subscanning direction delay circuit 25.

When the subscanning position of the scanner 1 has reached the identification information reading initiation position $B_1$, with repetition of the above-mentioned operation, the count number of the step signal h of the subscanning direction delay ciruit 25 amounts to a predetermined number and the carry k is produced, so that the AND gate $AND_2$ is opened. Simultaneously with the opening of the AND gate $AND_2$, one increment of the subscanning direction address counter 23 is effected by the applied step signal h, and an address signal is applied to the memory 21.

When the main scanning direction reading scanning position reaches $A_1$, the gate $AND_1$ is opened by the carry j produced from the main scanning direction delay circuit 24. When the gate $AND_1$ is opened, increment of the count value of the main scanning direction address counter 22 is effected in accordance with the scanning clock e which is produced correspondingly to the scanning position of the scanner 1. As a result, in accordance with the read scanning of the scanner 1, the image information f which is obtained from the scanner 1 is successively stored, one image element after another, in a address assigned by the main scanning direction address counter 22 and the subscanning direction address counter 23 in synchronism with the clock e.

When the main scanning direction reading position of the scanner 1 has reached an identification information main scanning direction reading termination position $A_2$, and the count value of the main scanning address counter 22 amounts to a maximum value, a further counting operation of the main scanning address counter 22 is stopped. Accordingly the image information f obtained from the scanner 1 is discarded without being stored in the memory 21 any further. When the main scanning direction read scanning position reaches a read termination position at the right end of the sheet 4, with a further advancement of the main scanning 65 direction read scanning of the scanner 1, the step signal h indicating the main scanning termination for one line is produced from the buffer apparatus 3. The step signal h is applied to the scanner 1, so that the subscanning direction read scanning position of the scanner 1 is moved onto the next line. At the same time, by the step signal h, the main scanning direction delay circuit 24 and the main scanning direction address counter 22 are reset by the step signal h, and one increment of the count value of each of the subscanning direction delay circuit 25 and the subscanning direction address counter 23 is effected.

The scanning for the next line is carried out likewise and the identification information f is stored, one image element after another, in the address assigned by the main scanning direction address counter 22 and the subscanning direction address counter 23. Hereafter, the identification information on the identification information bearing sheet 4 is likewise successively stored in a predetermined address of the random access memory 21, and when all of the identification information is stored in the random access memory 21 and the subscanning position of the scanner 1 reaches the identification information subscanning direction reading termination position $B_2$, the count value of the subscanning direction address counter 23 amounts to the maximum value and any further count operation is stopped, so that any further memory operation is prohibited.

When all of the identification information described in the writing assignment position 5 of the identification information bearing sheet 4 is stored in the random access memory 21, the writing mode is terminated.

A transmission mode for transmitting the image information obtained by scanning an original document with addition thereto of the identification information stored in the random access memory 21 by the above-mentioned writing mode will now be explained.

An original document is set in the read apparatus and the line density is set at a predetermined value. At this time, the clear signal b is produced and the address counters 22 and 23, and the delay circuits 24 and 25 are reset, and the change-over circuit 27 is changed over so as to apply the image information f obtained from the scanner 1 to the buffer apparatus 3.

When read scanning of the original document is initiated, the image information f obtained from the scanner 1 is applied to the buffer apparatus 3 through the change-over circuit 27. When the reading position of the scanner 1 reaches the identification information reading initiation position $B_1$, the carry k is produced from the subscanning direction delay circuit 25 and the AND gate $AND_2$ is opened and the step signal h is applied to the subscanning address counter 23, so that one increment of the count value thereof is effected and, at the same time, the change-over preparation of the change-over circuit 27 is made. When the reading position of the scanner 1 reaches the identification information reading initiation position $A_1$ after initiation of the main scanning in synchronism with the clock e, the carry j is produced from the main scanning direction delay circuit 24 and the AND gate $AND_1$ is opened and, at the same time, the change-over circuit 27 is changed over so as to apply the identification information i from the random access memory 21 to the buffer apparatus 3.

As a result, the identification information i is successively applied, one image element after another, to the buffer apparatus 3 through the change-over circuit 27, in synchronism with the clock e, from the address of the random access memory 21 in accordance with both the indication from the subscanning direction address counter 23 and the address indication from the main scanning direction address counter 22 whose increment is effected one by one by the clock e.

When the main scanning direction read scanning position of the scanner 1 reaches $A_2$, with the advancement of the read scanning by one line, a carry l is generated from the main scanning direction address counter 22. By the carry l, the change-over circuit 27 is changed over so as to apply again the image information f obtained from the scanner 1 to the buffer apparatus 3.

When the image information g for one line, which is produced from the identification information addition apparatus 2, is accumulated in a predetermined buffer element of the buffer apparatus 3, the step signal h is produced from the buffer apparatus 3, and the main scanning direction address counter 22 and the main scanning direction delay circuit 24 are then reset in order to initiate scanning of the next line, and increment of the subscanning address counter 23 and that of the subscanning delay circuit 25 are effected to a value corresponding to a predetermined line density.

Hereafter, the similar operation is repeated and the identification information i, which is stored in the random access memory 21, is read out at a predetermined scanning position, instead of the image information f from the scanner 1, and when addition of the identification information is completed, the carry m is generated from the subscanning direction address counter 23, so that the change-over circuit 27 is changed over by the carry m so as to apply the image information f obtained from the scanner 1 to the buffer apparatus 3 until read scanning equivalent to one original document is finished.

By transmitting the image information g obtained from the identification information addition apparatus 2 to the reception side from the buffer apparatus 3 through a modulator and other devices, a recording sheet bearing an image information and the added identification information in a predetermined line density can be obtained on the reception side.

In the above-mentioned embodiment, the identification information is added on the transmission side. However, such a necessary identification information can be likewise added on the reception side.

Furthermore, in the above-mentioned embodiment, one type of identification information is stored in the memory and the identification information is added when the original document is scanned. However, the present invention is not limited to this. Namely, it can be done that the memory is divided into a plurality of blocks and different types of identification information is stored in each block, so that a desired information is selected manually or automatically and the selected information is added when the original document is scanned.

Furthermore, in the case where the identification information to be added comprises a fixed information and a changeable information, for instance, the fixed information is " th Day of     , 19   " and the changeable information is a specific date and a year, it is possible to provide a memory means for storing the changeable information therein and when the identification information is added to the original information, the changeable information can be incorporated in the fixed information.

What is claimed is:

1. An identification information addition system of a facsimile apparatus comprising:
 a scanner on the transmitter side of said facsimile apparatus for scanning an original document, a plotter on the receiver side of said facsimile apparatus for scanning a recording sheet,
 an identification information bearing sheet on said transmitter side which bears an identification information at a predetermined position thereof,
 a memory apparatus on said transmitter side,
 a memory means for storing in a memory portion of said memory apparatus corresponding to a predetermined scanning portion of said scanner said identification information which is obtained with said identification information bearing sheet scanned by said scanner,
 a pick-out means for picking out said identification information stored in said memory apparatus at said predetermined scanning position of said scanner when said original document is scanned by said scanner, and
 an information displacement means for displacing part of an image information which is obtained by scanning said original document, with the identification information picked up; said plotter upon reception of the scanned information from said original document and said identification information printing the exact scanned information and identification information in the same location on said recording sheet as they appear on said original document.

2. An identification information addition system of a facsimile apparatus as claimed in claim 1, wherein said identification information bearing sheet is identical in size with said original document having an image information to which said identification information is to be added.

3. An identification information addition system of a facsimile apparatus as claimed in claim 1, wherein said memory apparatus is a non-volatile random access memory.

4. An identification information addition system of a facsimile apparatus as claimed in claim 1, wherein said memory means and said pick-out means respectively comprise the same and commonly usable system consisting essentially of a main scanning direction address counter for indicating a main scanning direction address of said memory apparatus, a subscanning direction address counter for indicating a subscanning direction address of said memory apparatus, a main scanning direction delay circuit for determining a writing initiation position and a reading initiation position in the main scanning direction in said memory apparatus, and a subscanning direction delay circuit for determining a writing initiation position and a reading initiation position in the subscanning direction in said memory apparatus.

5. An identification information addition system of a facsimile apparatus as claimed in claim 1, wherein said information displacement means is a change-over circuit capable of changing over image information which is obtained by scanning said original correspondingly to the scanning position of said scanner or said plotter to an identification information which is picked up from said memory apparatus, and vice versa.

6. An identification information addition system of a facsimile apparatus as claimed in claim 1, wherein said identification information comprises a plurality of different kinds of information, which are stored in different memory portions of said memory apparatus and which can be selectively picked up from said memory apparatus.

* * * * *